June 2, 1970     L. R. SPERBERG     3,515,195
METHOD OF IMPROVING THE DURABILITY OF TIRES
Filed Feb. 27, 1967
FIG. 1
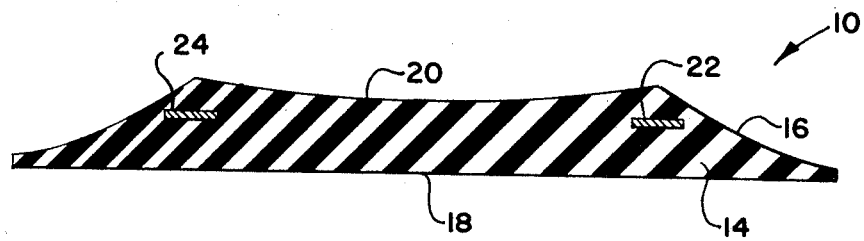
FIG. 2
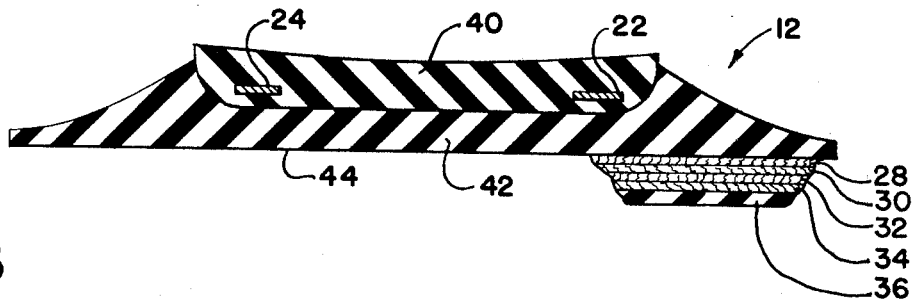
FIG. 3
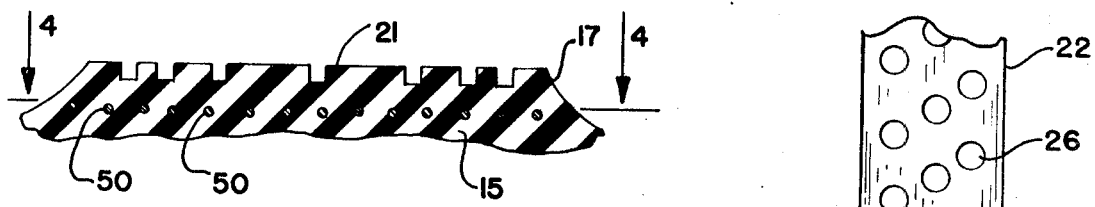
FIG. 4
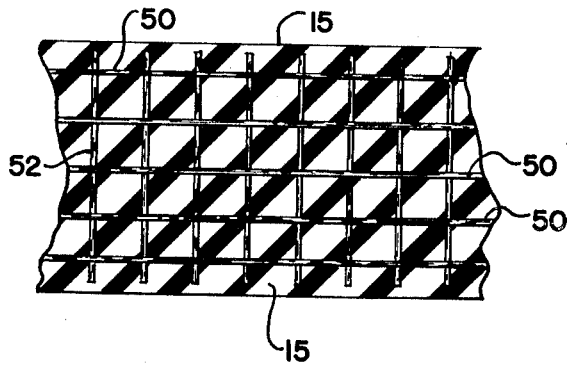
FIG. 5
INVENTOR.
LAWRENCE R. SPERBERG
BY
MARCUS L. BATES United States Patent Office 3,515,195
Patented June 2, 1970

3,515,195
METHOD OF IMPROVING THE DURABILITY OF TIRES
Lawrence R. Sperberg, 6740 Fiesta Drive,
El Paso, Tex. 79912
Continuation-in-part of application Ser. No. 602,123,
Dec. 16, 1966. This application Feb. 27, 1967, Ser.
No. 618,724
Int. Cl. B60c 19/06
U.S. Cl. 152—153                        8 Claims

ABSTRACT OF THE DISCLOSURE

A heat transferring mechanism associated with an elastomeric chamber, and includes an agent which may be directly added to the gas containing chamber of an elastomeric device, such as a pneumatic tire. The heat transferring agent may be any liquid or finely divided solid which is compatible with the liner of the tire. The mechanism also includes a metallic ribbon or wire having high heat conduction and is embedded inside the elastomeric material of the tire. The liquid may include an oxygen scavenger and a suitable anti-freeze, such as a hydrazine/water/ethylene glycol mixture. The solid may include an oxygen scavenger such as powdered zinc, along with a suitable slipping agent.

Cross-references to related applications

U.S. Ser. Nos. 601,275, now abandoned; 601,451; and 602,123, now Pat. No. 3,370,915.

Background of the invention

In my copending patent applications Ser. Nos. 601,275; 601,451; and 602,123, of which this patent application is a continuation in part, the effect of tire non-uniformity, as well as the effect of flexing of the shoulder buttress area upon the durability and wear rate is disclosed in detail.

A tire having minimum force variations in a lateral and radial plane with respect to the equatorial plane of the tire will exhibit a maximum durability and wear rate as contrasted to a more non-uniform tire. When the gas chamber of any tire is provided with an inert atmosphere the durability and wear rate is further improved, regardless of the imperfectness of the tire.

An inert atmosphere may be provided within an elastomeric chamber by nitrogen inflation, inflation with the various rare gases, or by inflation with flue gases obtained from an inert gas generator. Still another method of providing an inert atmosphere within an elastomeric chamber may be practiced by providing the chamber with an oxygen reacting substance whereby all of the oxygen contained within the gas chamber is chemically changed into a compound which is inactive with respect to the elements of the tire.

In providing an inert atmosphere within an elastomeric chamber by means of chemical reactions, the use of hydrazine, a hydrazine/water mixture, or the use of a hydrazine/gaseous mixture causes the formation of excess moisture within the elastomeric chamber. The liquid phase resulting from the formation of water in carrying this expedient into practice has been found to have beneficial results in that the water and water-vapor acts as a heat transferring vehicle wherein hot spots that are formed along the insde peripheral surface of the tire are cooled because of the ability of the water to transfer heat from regions of high temperature to regions of low temperature.

Summary

A liquid, or finely divided solid, when added to the gas chamber of a pneumatic tire, aids in maintaining the inside peripheral surface of the gas chamber, as well as the remaining tire structure, at a more uniform temperature. Another expedient that maintains the elements of a tire at a more uniform temperature is the provision of a metallic member located adjacent the tire cords in the tread wearing compound. These expedients eliminate, or greatly reduce, localized hot spots within the tire to thereby greatly increase the durability of the tire.

The presence of liquid water within an elastomeric chamber is objectionable in geographical locations where freezing can occur. Accordingly, it is desirable to provide a substance in conjunction with the water to thereby prevent the formation of ice when freezing conditions are encountered.

It is further desirable to provide an elastomeric chamber with a liquid in an amount that will effectively provide a heat transferring agent to thereby preclude or minimize the effect of localized hot spots that normally occur along the inside peripheral surface of a penumatic chamber, to thereby transfer heat away from the area of the tire that is undergoing maximum energy changes. It is further desirable to provide a pneumatic chamber with a substance which tends to average the temperature level about the inside peripheral area of a penumatic tire.

The primary object of this invention is the provision of a method by which localized hot spots induced into the elements of an elastomeric gas chamber due to the mechanical flexing thereof may be reduced in intensity by conveying heat from high temperature regions to low temperature regions.

Another object of this invention is the provision of a method by which the heat generated as a result of non-uniform force variations contained within a pneumatic tire may be minimized.

Still another object of this invention is the provision of a method by which the upper buttress, tire crown, and shoulder of a pneumatic tire may be maintained at lower temperature levels than has heretofore been possible.

A still further object of this invention is to effectively convert the performance of all tires of a group, each having varying non-uniformities, so as to enable each tire to approach the performance level of the more nearly perfect tires of that group.

A further object of the present invention is the provision of a method that enables the chemical removal of oxygen within a pneumatic tire while simultaneously enabling regions of high temperature therewithin to be cooled to thereby elongate the normal durable life of a pneumatic tire.

A still further object of this invention is the provision of a method by which durability and wear data may be obtained from a pneumatic tire beyond or in excess of the normal life of the tire.

A still further object of this invention is the provision of a substance which may be added to the gas chamber of a pneumatic tire that will maintain the inside peripheral surface of the gas chamber and the elements of the tire associated therewith at a more uniform temperature than has been heretofore attained, to thereby improve tire safety and durability.

The above objects, desires, and purposes are attained in accordance with the method of the present invention by the inclusion of a substance which is added to the elements of the tire, including the gas chamber of a pneumatic tire, which acts as a heat transferring agent to thereby remove heat from high temperature regions associated with the elements of the tire to a lower temperature region of the tire.

In carrying out one embodiment of the present invention, a substance having the property of acting as a heat transferring agent is added directly to the gas chamber of a pneumatic tire. The heat transferring agent may be a liquid or a finely divided solid. Where the substance is a liquid, it is preferable that additives be incorporated therewith in order to remove oxygen from the gas chamber as well as to prevent freezing when the invention is practiced in geographical locations associated with freezing climatic temperatures. The substance, as well as the additive, must be compatible with the elements of the tire, including inner tubes, where inner tubes are employed.

This invention also comprehends the provision of heat conductor members that are placed within the elements of the tire, with the elements being disposed circumferentially about the tire in parallel relationship with respect to the equatorial plane of the tire. The heat conducting members may be in the configuration of ribbons, rods, or wire, and may be fabricated from a high conducting material such as copper. The surface of the heat conducting member is preferably treated to provide a suitable bond between the rubber and the heat conducting member. The members are preferably placed within the shoulder and/or upper buttress area of the tire. Where the configuration of the members resemble that of a matrix, they are placed in the tread rubber compound near the groove bottoms of the tire in a manner to extend from the shoulder and upper buttress area on one side, across the crown, to the shoulder and/or upper buttress area of the other side.

While this invention is best practiced by using the heat transferring agent within the air chamber in conjunction with the heat conducting members associated with the tire elements, it should be understood that either expedient, when used alone, also falls within the comprehension of this invention.

Brief description of the drawings

FIG. 1 is a cross-sectional view of an unvulcanized tread wearing compound as it is extruded from a die and prior to being assembled into an uncured tire.

FIG. 2 is a partial cross-sectional view of an unvulcanized tire, with some parts broken away for clarity.

FIG. 3 is a partial cross-sectional view of a vulcanized, retreaded tire tread section.

FIG. 4 is a partial cross-sectional view taken along line 4—4 of FIG. 3.

FIG. 5 is a fragmentary enlarged plan view of part of the device seen in FIG. 1 or 2.

Description of the preferred embodiments

Looking now to the details of the drawings, wherein there is illustrated a cross-sectional view of an extruded uncured tire tread rubber compound generally indicated by the arrow at numeral 10, and another unvulcanized tire tread rubber compound generally illustrated by the arrow at number 12. The tread of FIG. 1 is comprised of a single high-abrasive tread section while the tire of FIG. 2 includes a tire having multiple tread sections.

The uncured rubber tread portion 14 includes a lower buttress material 16, an inside (or cord side) 18, and an outside (or ground contacting portion) 20. Incorporated within the uncured rubber tread compound in spaced apart relationship is a pair of heat conductors 22 and 24, with each conductor being located in oppositely disposed relationship with respect to the unvulcanized rubber, and preferably positioned in a manner to be circumferentially disposed within the shoulder and/or upper buttress area after the tire has been vulcanized. While the heat conductor members, 22 and 24, may be positioned as illustrated in FIGS. 1 and 2, they may also be positioned in a location closer adjacent the outer ply where they will not be exposed should the tire be worn to baldness. With particular reference to FIG. 2, the elements 22 and 24 may be located deeper within the tread rubber in close proximity to the tire cord material, if desired.

Each of the heat conducting members, 22 and 24, may be fabricated from an elongated piece of highly conductive material, such as exemplified by copper. The heat conductor receives a surface treatment to increase the bond between the rubber compound and the individual members. Each member is preferably a strip of copper one quarter inch wide, and .010 inch thick, and having apertures 26 provided therein so as to allow the rubber to flow through the individual apertures to thereby rigidly maintain the ribbon 22 within the rubber compound. The tire illustrated in FIG. 2 includes the outer-most ply 28, ply 30 adjacent to the outer-most ply, ply 32 adjacent to the inner-most ply 34, and a liner compound 36.

When desired, a highly abrasive tread section 40 may be combined with a lower abrasive undertread section 42 to thereby enable the fabrication of a tire having an outer portion comprised of two different compounded ingredients.

It should be understood that while the heat conducting members 22 and 24 of FIG. 2 are illustrated as being contained within the outer high abrasive tread wearing rubber compound 40, the elements may also be located at the interface between the high abrasive rubber 40 and the lower abrasive rubber compound 42. Furthermore, the heat conducting elements may be placed entirely within the lower abrasive rubber 42, and spaced further apart so as to be more centrally located within the shoulder and/or upper buttress area of the completed tire.

FIG. 3 illustrates a vulcanized retreaded tire having a tread 15, a shoulder and upper buttress area 17, and a multiplicity of conventional tread ribs 21 about the outer periphery thereof. A metal matrix 50, having longitudinally extending rods or wires 50 and perpendicularly extending rods 52 rigidly affixed to the longitudinal members 50, is suitably provided between the detreaded tire and the new tread wearing material of the recapped tire.

In the embodiment embraced by FIG. 1, the heat transferring members 22 and 24 are preferably extruded within the uncured rubber tread compound prior to its placement upon the remaining tire elements during the tire building process. Where deemed desirable, the heat transferring members 22 and 24 may alternatively be placed adjacent surface 18 near the shoulder and/or upper buttress area 16 after the unvulcanized tire tread 14 has been extruded, so as to permit overlapping of the free ends of the heat conducting member an amount that will permit the free ends to attain an abutting relationship after the tire has been placed into the tire mold and expanded into its final configuration. This latter expedient may be objectionable because of the excess time involved in attaining the latter described position of the heat conducting member.

In the embodiment illustrated in FIG. 2, the heat conducting members 22 and 24 may be extruded within the uncured high abrasive rubber compound 40 in the illustrated manner. Alternatively, the heat conducting members may be extruded coextensively with the lower abrasive rubber material 42 and positioned further apart than illustrated in FIG. 2, if desired. Where time is not of essence, the heat conducting members 22 and 24 may be pre-cut a predetermined amount and placed at the interface between the rubber material 40 and 42 so as to permit the free ends of the members to meet one-another in abutting relationship upon expansion of the tire into its final configuration.

In the retreaded tire of FIGS. 3 and 4, the matrix (50 and 52) is preferably placed about a detreaded or prepared tire by bringing the free ends of longitudinally extending members 50 into abutting relationship with each other prior to applying the unvulcanized tread wearing compound 15 thereto. This expedient permits the incorporation of the perpendicularly extending components (50 and 52) of the heat transferring members, or metallic matrix, to extend across the entire tread portion, from the upper buttress area on one side, across the crown; to the upper buttress area of the opposite side.

Where it is desired to incorporate a heat transferring member in the form of a rubber, wire, or metallic matrix, similar to that of FIGS. 1, 2, 3, and 4 into a new tire, it is necessary that the members 20, 22, 50, and 52 be fabricated into a coiled or serpentine or biased configuration with respect to each other so as to permit the ribbon or wire or matrix to be expanded from the diameter of the tire building drum to the final diameter of the vulcanized tire in a manner similar to the expansion or distortion required of the tire cords in a conventional tire building process.

The matrix can be located anywhere within the rubber compound, but is preferably located whereby each side extends from the shoulder or upper buttress area of one side, across the crown of the tire to the shoulder or upper buttress area of the opposite side, and wherein the matrix is located in close proximity to the outermost ply of the tire whereby the matrix will not be destroyed during the normal life of the tire.

The following examples illustrate the preferred manner by which the method of the present invention can be practiced:

EXAMPLE 1

Ethylene glycol and water were mixed together in a one to four proportion, respectively, to form a mixture. Six ounces by weight of the mixture was added to the gas chamber of an 8.25-14 pneumatic tire. This mixture provided a liquid which was found to remain in the liquid phase down to a temperature of 10° F. This quantity of liquid will "wet" the entire inside peripheral area of the air chamber, leaving several ounces of excess liquid contained therein. When the tire is rotated at a speed which simulates a normal start up, or acceleration of a vehicle; it was found that the liquid induced no undue imbalance to the mounted tire. Accordingly, it is believed that the excess liquid contained in the tire continued to be dispersed in a uniform manner about the inside peripheral wall of the gas chamber as the tire gained momentum. At high rotational speeds some of the excess liquid is vaporized whereby it proceeds through a continuous cycle of impinging on the inside peripheral wall of the gas chamber, gathering into droplets sufficient in size to be swept from the wall, to again be dispersed into small particles until once again the particles impinge upon the wall, perhaps in a different location, whereupon they again proceeded through the above described cycle of accumulating into droplets sufficient in size to be vaporized by the rotational motion of the tire.

Since the average tire contains approximately twenty-eight p.s.i.g. or forty-two p.s.i.a., and since the boiling point of water at forty-two p.s.i.a. is approximately 270° F., the presence of the water vapor, so far as regards the internal pressure of the gas chamber, is of little significance. This, of course, does not bring into consideration the effect that the freezing depressant, such as ethylene glycol, may have upon the boiling point of the liquid.

EXAMPLE 2

Six ounces of powdered zinc dust along with a slipping agent, such as pyrogenic silica (Cab-O-Sil), was thoroughly mixed together and placed in a hermetically sealed container with oxygen excluded therefrom for proper storage. The six ounces of powdered zinc, along with the slipping agent, were added to the gas chamber of a pneumatic tire. The tire was properly inflated and rotated to simulate a normal start up or acceleration of a vehicle. No undue vibrations were observed to be caused by the powdered zinc. The powdered zinc is believed to have been disseminated by the rotational motion of the tire, and accordingly the metallic zinc continually contacted various portions of the inside peripheral wall of the gas chamber, thereby either gaining or losing heat dependent upon the temperature of the wall surface being contacted by each individual particle of zinc.

EXAMPLE 3

A new tire was provided with a pair of heat conducting members, such as illustrated in FIG. 5. The tire was prepared by removing the tread, placing the heat conducting members (0.010 inch thick by one quarter inch wide) circumferentially about the tire carcass in the illustrated manner of FIG. 1, and vulcanizing a suitable tread stock onto the detreaded tire. The members were arranged with the free ends thereof in abutting relationship, thereby providing a heat sink in the shoulder area of each side that extended circumferentially and entirely about the tire.

The tire was evaluated and the durable properties were found to exceed those exhibited by ordinary tires.

EXAMPLE 4

A new tire was prepared with heat conducting members arranged in the tire in the same manner of Example 3, and the tire was additionally provided with the heat transferring agent as set forth in Example 1. The improvement in durability was found to exceed that obtained in either of the previous Examples 1 or 3 as set forth above. This improvement was to be expected since the heat sink provided by heat conducting members prevented the occurrence of local hot spots by averaging the temperature about the periphery of the tire, while the heat transferring agent acted in the before described manner.

While only four examples have been cited in order to enable others to practice the present method of improving the durability of tires by maintaining the elements of a tire at a more constant temperature, it will be understood that it is within the comprehension of this invention to use substances other than the materials set forth in detail in the above examples. For example, having now read my disclosure, it will occur to other skilled in the art to use various other glycols as well as various alcohols, so long as these liquids are found to be compatible with the elements of a tire. It will also occur to others to use various other powdered metals including powdered iron, powdered aluminum, or powdered magnesium; as well as various mixtures thereof; along with suitable slipping agents and inerts. Furthermore, the exact mechanical configuration of the heat transferring members may include members that are fabricated into a number of various other forms while still remaining within the spirit of this invention.

Furthermore, in light of the present disclosure, it will occur to others skilled in the art to use oxygen scavengers, such as hydrazine, along with a suitable diluent, such as water (in order to render the chemical stable), and including an anti-freeze such as the alcohols or the glycols which are compatible with the elements of the tire. Accordingly, the above disclosure should not be construed in any limiting manner so far as regards the metes and bounds of my intellectual property.

Therefore, what I claim and desire to protect by U.S. Letters Patent is set forth in the following claims:

1. The method of improving the durability of a pneumatic tire comprising the steps of:
   (1) placing elongated metallic members within the upper buttress area of the tire; and
   (2) at least partially filling the gas chamber of the tire with a heat transferring agent comprising essentially a mixture of hydrazine and water.

2. The method of claim 1 and further including the step of extruding the metallic members along with the uncured rubber compound prior to the building of the tire to thereby enable the members to be placed in the upper buttress area of the tire.

3. The method of claim 1 and further including the step of spacing the metallic members apart from one another to form a metallic matrix which can be distorted along with the rubber compound during the tire building process.

4. The method of improving the durability of a pneumatic tire comprising the steps of:
   (1) placing elongated metallic members within the upper buttress area of the tire; and
   (2) at least partially filling the gas chamber of the tire with a heat transferring agent comprising essentially a finely divided deoxidized metal.

5. The method of claim 4 and further including the step of extruding the metallic members along with the uncured rubber compound prior to the building of the tire to thereby enable the members to be placed in the upper buttress area of the tire.

6. The method of claim 4 and further including the step of spacing the metallic members apart from one another to form a metallic matrix which can be distorted along with the rubber compound during the tire building process.

7. The method of claim 4 wherein said metal is iron.

8. The method of improving the durability of a tire comprising the steps of:
   (1) filling a portion of the gas chamber of a pneumatic tire with a finely divided metal to thereby provide a heat transferring agent and an oxygen scavenger;
   (2) vulcanizing an elongated piece of metal within the upper buttress area of a tire to thereby provide a heat transferring member that reduces localized areas of heat to a minimum by transferring heat from hot regions to cooler regions of the tire.

References Cited

UNITED STATES PATENTS

| | | | |
|---|---|---|---|
| 1,457,892 | 6/1923 | Blackwelder | 152—153 |
| 2,237,207 | 4/1941 | Zimmerman et al. | 152—330 |
| 2,797,721 | 7/1957 | Hicks | 152—330 |
| 2,806,767 | 9/1957 | Chenicek | 23—220 |
| 2,884,039 | 4/1959 | Hicks | 152—330 |
| 2,948,321 | 9/1960 | Mote | 152—153 |
| 3,003,536 | 10/1961 | Culberson | 152—330 |
| 3,008,506 | 11/1961 | Hicks | 152—330 |
| 3,230,999 | 1/1966 | Hicks | 152—330 |
| 3,312,265 | 4/1967 | Turner | 152—330 |

FOREIGN PATENTS

| | | |
|---|---|---|
| 409,467 | 4/1910 | France. |
| 955,081 | 1/1960 | France. |
| 622,033 | 6/1961 | Canada. |

ARTHUR L. LA POINT, Primary Examiner

C. B. LYON, Assistant Examiner

U.S. Cl. X.R.

152—330